US009352989B2

(12) United States Patent
Lacasse

(10) Patent No.: US 9,352,989 B2
(45) Date of Patent: May 31, 2016

(54) WATER TREATMENT APPARATUS AND METHOD

(71) Applicant: BioCAST Systems Inc., Montreal (CA)

(72) Inventor: Maurice Lacasse, Chambly (CA)

( * ) Notice: Subject to any disclaimer, the term of this patent is extended or adjusted under 35 U.S.C. 154(b) by 340 days.

(21) Appl. No.: 14/138,700

(22) Filed: Dec. 23, 2013

(65) Prior Publication Data

US 2014/0110338 A1 Apr. 24, 2014

Related U.S. Application Data

(60) Division of application No. 12/780,055, filed on May 14, 2010, now Pat. No. 8,641,897, which is a continuation-in-part of application No. PCT/CA2008/001998, filed on Nov. 12, 2008.

(30) Foreign Application Priority Data

Nov. 14, 2007 (CA) ..................................... 2607713

(51) Int. Cl.
*C02F 1/78* (2006.01)
*C02F 1/20* (2006.01)
*C02F 1/44* (2006.01)
(Continued)

(52) U.S. Cl.
CPC ................ *C02F 1/78* (2013.01); *B01D 61/145* (2013.01); *B01D 61/147* (2013.01); *B01D 65/02* (2013.01); *C02F 1/20* (2013.01); *C02F 1/444* (2013.01); *C02F 9/00* (2013.01); *B01D 2311/04* (2013.01); *B01D 2321/18* (2013.01); *C02F 2201/782* (2013.01); *C02F 2209/23* (2013.01);
(Continued)

(58) Field of Classification Search
CPC ........ B01D 61/04; B01D 61/10; B01D 61/12; B01D 61/145; B01D 61/147; B01D 61/16; B01D 61/22; B01D 65/02; B01D 2201/20; B01D 2201/202; B01D 2201/204; B01D 2201/206; B01D 2201/208; B01D 2251/102; B01D 2257/106; B01D 2311/00; B01D 2311/12; B01D 2311/14; B01D 2311/2634; B01D 2311/2661; B01D 2311/2665; B01D 2313/24; B01D 2321/18; C02F 1/20; C02F 1/44; C02F 1/441; C02F 1/442; C02F 1/444; C02F 1/445; C02F 1/78; C02F 9/00; C02F 2201/782; C02F 2209/23; C02F 2301/046; C02F 2301/066; C02F 2303/14; C02F 2303/20; C02F 2303/22; C02F 2303/26
See application file for complete search history.

(56) References Cited

U.S. PATENT DOCUMENTS 5,271,830 A * 12/1993 Faivre ....................... C02F 1/78
 210/151
2003/0234225 A1* 12/2003 Brunsell ................... C02F 1/78
 210/760

*Primary Examiner* — Lucas Stelling
(74) *Attorney, Agent, or Firm* — Brouillette & Partners; Robert Brouillette

(57) ABSTRACT

An apparatus and a method for an ozone-based treatment of polluted water are disclosed. The apparatus and the method generally comprise three stages. The first stage is an ozone treatment stage wherein the polluted water is treated with ozone gas. The second stage is a gas-liquid separation stage wherein excess non-dissolved gases, from the ozone treatment stage, are removed from the water whereby the water exiting the gas-liquid separation stage is substantially saturated with dissolved gases and substantially free of non-dissolved gases. The last stage is a membrane filtration stage wherein the gas-saturated water generally undergoes microfiltration or ultra-filtration. Microbubbles formed during this final stage generally prevent the accumulation of particles and pollutants on the surface of the membranes and/or inside the openings or pores thereof; thereby acting as a self-cleaning mechanism for the membrane filter.

23 Claims, 5 Drawing Sheets

(51) Int. Cl.
  *B01D 61/14*   (2006.01)
  *B01D 65/02*   (2006.01)
  *C02F 9/00*    (2006.01)

(52) U.S. Cl.
  CPC ..... *C02F2301/046* (2013.01); *C02F 2301/066* (2013.01); *C02F 2303/14* (2013.01); *C02F 2303/20* (2013.01); *C02F 2303/22* (2013.01)

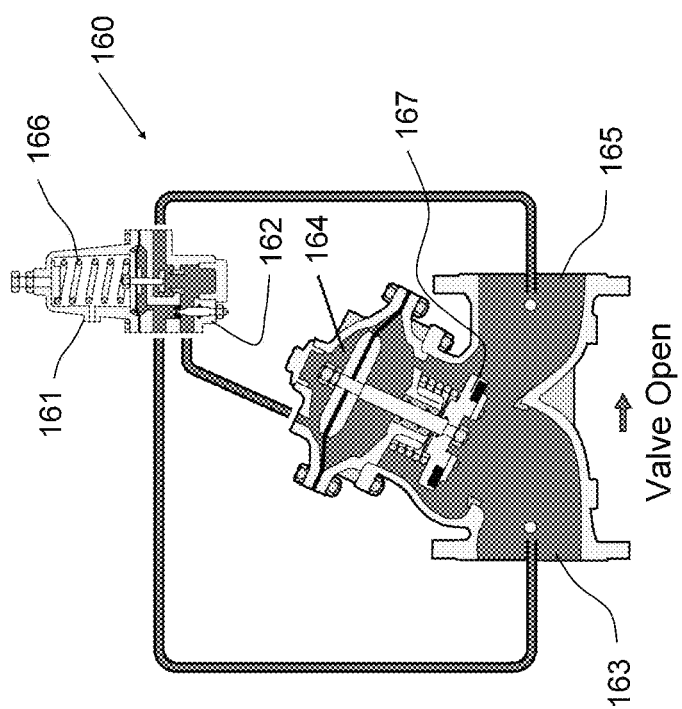
FIG. 4a Valve Open
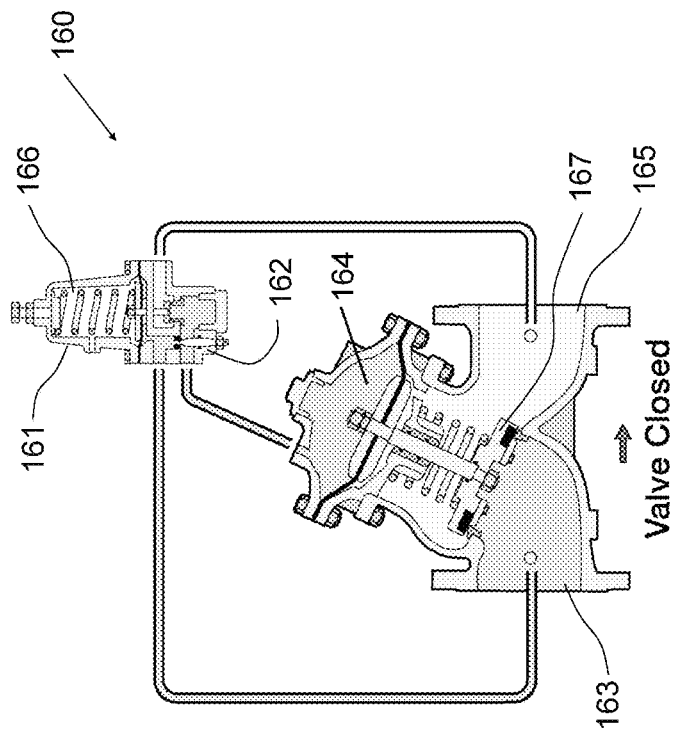
FIG. 4b Valve Closed

WATER TREATMENT APPARATUS AND METHOD

CROSS-REFERENCE TO RELATED APPLICATIONS

The present patent application is divisional application of U.S. patent application Ser. No. 12/780,055, entitled "Water Treatment Apparatus and Method", and filed at the United States Patent and Trademark Office of May 14, 2010, itself a continuation-in-part application of International Patent Application No. PCT/CA2008/001998, entitled "Water Treatment Apparatus", and filed at the World Intellectual Property Organization on Nov. 12, 2008, itself claiming the benefits of priority of Canadian Patent No. 2,607,713, entitled "Water Treatment Apparatus", and filed at the Canadian Intellectual Property Office on Nov. 14, 2007. The content of the all the aforementioned applications and patent being incorporated herein by reference in their entirety.

FIELD OF THE INVENTION

The present invention generally relates to apparatuses, systems and/or methods used in the purification and filtration of liquids. More particularly, the present invention relates to apparatuses, systems and/or methods using essentially ozone and filters for the purification and filtration of water.

BACKGROUND OF THE INVENTION

In today's world, water sources for human consumption or other uses can often contain contaminants and various pollution elements such as pathogens which may cause various infections (e.g. bacteria, viruses, etc.) and organic and inorganic substances which may cause unwanted odor and color to the water sources. Naturally it is desired to reduce the amount of contaminants in water, especially if the water is destined to be consumed by people.

In the past, water treatment systems have been mainly managed by municipalities, in order to accommodate the drinkable and recreational water needs of their population, and also treat waste water. Lately, the increasing concerns regarding the environment, the standards associated to its protection and the emergence of larger scale projects in construction have changed the requirements and the mission of water treatment systems. Also, available water sources can be of different nature, including surface waters or ground water.

These days, water treatment systems need to be more adaptable to various types of environments. They must use products and offer water quality following very strict environmental regulations and at the same time, be less expensive to be attractive to smaller municipalities and private interests.

Previous methods and systems for reducing contaminants in water have used, for example chlorine and ozone. Of these substances ozone has recently become more and more popular since ozone is one of the most powerful oxidizers and disinfectants available.

On the one hand, the most commonly used disinfectants are hypochlorous acid (HOCl) and hypochlorite (OCl⁻) (customarily referred to as free chlorine in the industry). Also used but to a lesser degree are hypobromous acid (HOBr) and hypobromite (OBr⁻) (likewise, referred to as free bromine). However, most compounds that produce chlorine in water sources influence the pH thereof. It is therefore necessary to add either an acidic or a caustic substance to maintain a certain pH. This means that the water treatment systems need to have two injection systems: one for the selected disinfectant, and another one for the pH control.

On the other hand, ozone exhibits biocidal qualities in concentrations over 0.4 parts per million, when dissolved in water. Ozone is a semi-stable gas formed of three oxygen atoms, instead of the two atoms that form oxygen gas. Ozone is most typically produced by an electrical arc discharged through air causing oxygen atoms to combine with an oxygen free radical that is formed. Ozone rapidly undergoes reaction to revert to more stable oxygen, releasing an oxygen free radical in the process. Two such free radicals can combine to form an oxygen molecule or the free radicals can oxidize an oxidizable substance.

Ozone not only kills bacteria, but also inactivates many viruses, cysts and spores. In addition, ozone oxidizes many organic chemical compounds, including chloramines, soaps, oils and other wastes thereby rendering them harmless to the environment. Accordingly, ozone may be used for a number of purposes, including: purification of water used for drinking, in food cleaning and processing, in ice machines, in swimming pools and spas and waste water treatment.

Although ozone is especially beneficial for breaking down certain contaminants in water, obtaining an effective concentration of ozone in water may be difficult and may represent a more expensive solution in a water treatment system. At a high concentration, ozone is a toxic and corrosive gas which is considered to be a pollutant by The United States Environmental Protection Agency (EPA), such that special provisions must be made for the containment and removal of the excess ozone.

Though the use of ozone in water treatment apparatuses and systems has generally proven to be effective, it remains that ozone can seldom be used alone since some pollutants need to be physically removed from the water. Hence, in prior art water treatment apparatuses and systems, ozone treatments were generally combined with filtration treatments, before and/or after the ozone treatments, in order to remove larger pollutants and/or particles from the water. For example, U.S. Pat. No. 5,427,693 (Mausgrover), U.S. Pat. No. 5,711,887 (Gastman) and U.S. Pat. No. 6,464,877 (Mori) all teach such prior art apparatuses or systems.

Yet, one major drawback of prior art water treatment apparatuses and systems is the need to regularly clean the filters which tend to become clogged with pollutants over time. Generally, cleaning filters implies the physical and/or chemical cleaning of the filters. This, in turn, necessitates that the apparatus or system be shut down while the filters are cleaned or changed.

Notwithstanding the existence of prior art ozone water treatment apparatuses and systems, it remains clear there is a need for an improved water treatment apparatus which mitigates the shortcomings of the prior art apparatuses and systems.

SUMMARY OF THE INVENTION

The aforesaid shortcomings are mitigated and several advantages are realized by generally providing a novel water treatment apparatus and related method which advantageously use the oxidative property of ozone to purify and disinfect polluted water and which advantageously uses a white water creation stage during the passage of gas-saturated water through the membrane filters as a self-cleaning mechanism thereof. Hence, in accordance with the principles of the present invention, the present apparatus and method generally use ozone both to purify water and to clean the membrane filters.

As used above and hereinafter, the expression "white water" designates a mixture of water and nascent gas or gases obtained by the depressurization of gas-saturated pressurized water made up of a mixture of gas or gases and water in equilibrium at a predetermined pressure. Hence, the white color of the water thus obtained is caused by the formation of microbubbles and hence refers to the color of the water at the moment of the depressurization. Notably, white water will not form adequately when there are non-dissolved gases (e.g. bubbles) present in the water.

The present apparatus generally comprises a fully pressurized water treatment chain having several stages or modules. Hence, after being pumped into the apparatus by a pumping unit comprising one or more pumps, the raw water generally flows toward an ozone treatment module in which ozone is first injected into the raw water, generally by means of a venturi or other known gas injector, and is then allowed a generally predetermined contacting time in a pressurized contacting chamber. The contacting chamber is generally designed to allow an efficient dissolution of the ozone into the water and also to give the dissolved ozone time to react with at least a portion of the pollutants contained in the water.

The water exiting the contacting chamber passes through a pressure sustaining valve and then flows toward a gas-liquid separation module. The gas-liquid separation module, via one or more gas-liquid separators, removes essentially all the excess non-dissolved gases (e.g. oxygen, nitrogen, ozone) remaining in the water in order to provide water saturated with dissolved gases and generally free of non-dissolved gases (e.g. bubbles). The gas-liquid separation module also has the additional advantage of removing at least a portion of the non-dissolved volatile compounds which may still be present in the water. Understandably, since the non-dissolved gases removed from the water could comprise toxic and/or corrosive gases, it is preferable to send the removed gases to a gas treatment unit for further processing and/or destruction.

The gas-saturated water exiting the gas-liquid separation module is then sent to the membrane filtration module for filtration treatment.

According to an important aspect of the present invention, as the gas-saturated water flows through the membranes, the particles still present in the water are removed. Also, the water is subjected to a depressurisation as it passes through the membranes. This, in turn, will cause the formation of a substantial amount of microbubbles, some of which will be formed inside the openings (e.g. pores) of the membranes and/or at the periphery of the surface thereof. The formation of the microbubbles will cause the water to turn into milky white water.

According to an important aspect of the present invention, the microbubbles formed during the passage of the gas-saturated water through the openings of the membrane filters will generally coagulate the small particles still present in the water, and/or will generally prevent the accumulation of particles on the surface of the membranes, and/or will generally dislodge particles present on the surface of the membranes, and/or will generally expel particles which may have been clogging openings of the membranes. Hence, the formation of microbubbles acts as an efficient self-cleaning mechanism for the membranes.

As the gas-saturated water enters the membrane filter, a portion thereof (hereinafter "the filtrate water") actually goes through the membrane and is effectively filtered thereby. However, according to another aspect of the present invention, the remaining portion of the gas-saturated water (hereinafter "the retentate water") that does not actually go through the membrane is generally looped back to the ozone treatment module where it is mixed with raw water and further treated by the apparatus.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIGS. 4a and 4b are side cross-sectional views of an exemplary pressure regulating unit embodied as a pressure sustaining valve, respectively in open and closed positions.

DETAILED DESCRIPTION OF THE PREFERRED EMBODIMENT

A novel water treatment apparatus and a related method will be described hereinafter. Although the invention is described in terms of specific illustrative embodiments, it is to be understood that the embodiments described herein are by way of example only and that the scope of the invention is not intended to be limited thereby.

The water treatment apparatus in accordance with the principles of the present invention generally comprises three stages or modules: an ozone treatment module 100, a gas-liquid separation module 200, and a membrane filtration module 300. Generally speaking, the ozone treatment module 100 is generally responsible for the injection of ozone into the water and for the mixing and contacting of the ozone and the water. The gas-liquid separation module 200, located downstream of the ozone treatment module 100, is used to separate and remove essentially all the non-dissolved gases (e.g. oxygen, nitrogen, ozone), typically in the form of bubbles, which may still remain in the water following the ozone treatment module 100. The gas-liquid separation module 200 is also used to provide gas-saturated water to the membrane filtration module 300 located downstream thereof. As the name implies, the membrane filtration module 300 filters the ozone treated water with one or more membrane filters in order to remove remaining solid particles and pollutants still present in the water.

Figure 1:
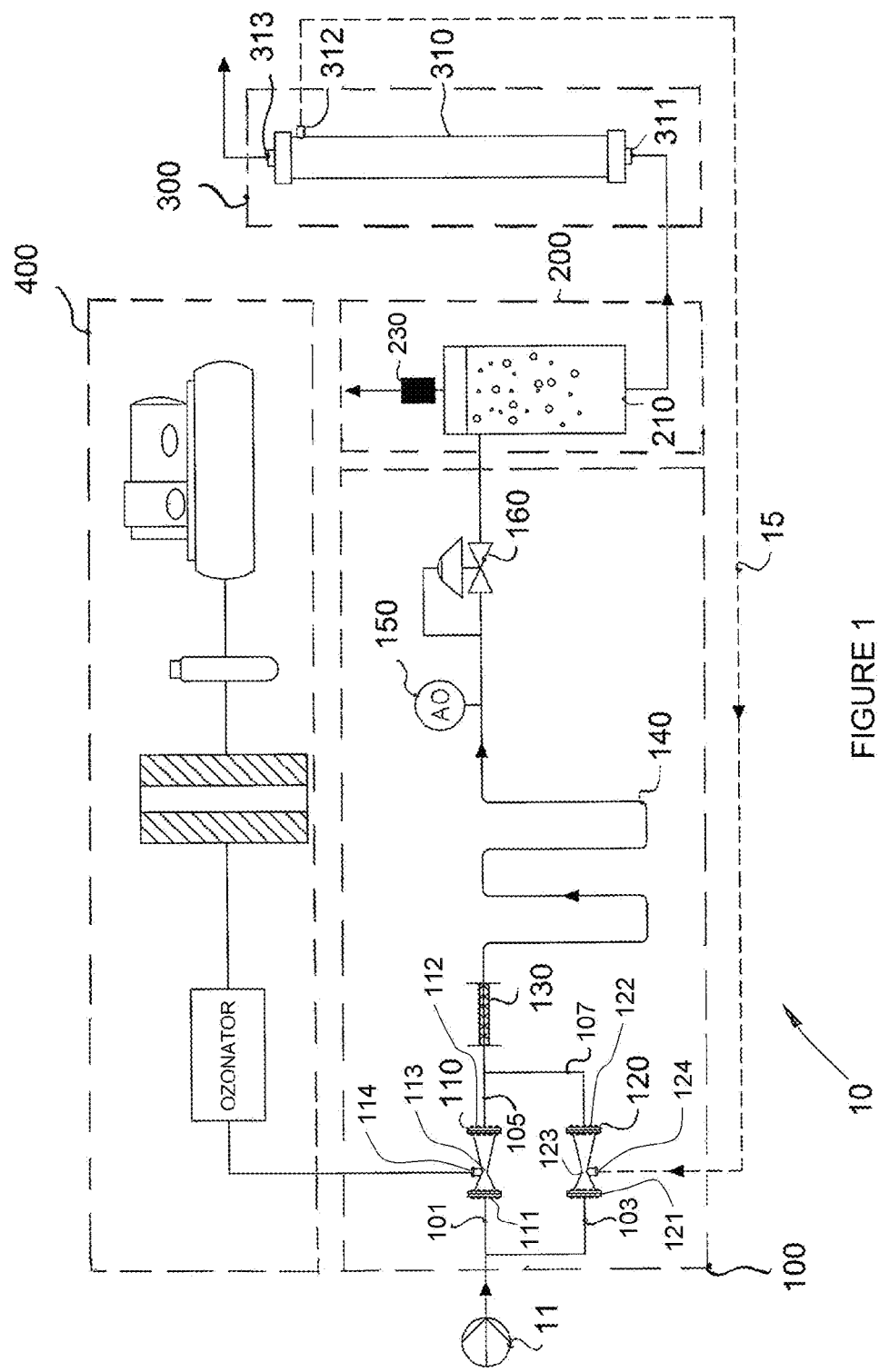
FIG. 1 is a schematic view of an embodiment the water treatment apparatus of the present invention.

Referring now to FIG. 1, initially, the polluted or raw water (hereinafter "raw water") to be treated in first pumped into the apparatus 10 via a pumping unit 11 comprising one or more pumps. The pumping unit 11 generally provides the necessary pressure and flow to the raw water for the proper functioning of the apparatus 10.

According to the present embodiment, the pumping unit 11 provides between 100 and 200 psig of pressure to the raw water.

In the present embodiment, downstream of the pumping unit 11, the raw water is split between a first pipe 101 and a second pipe 103.

Figure 2:
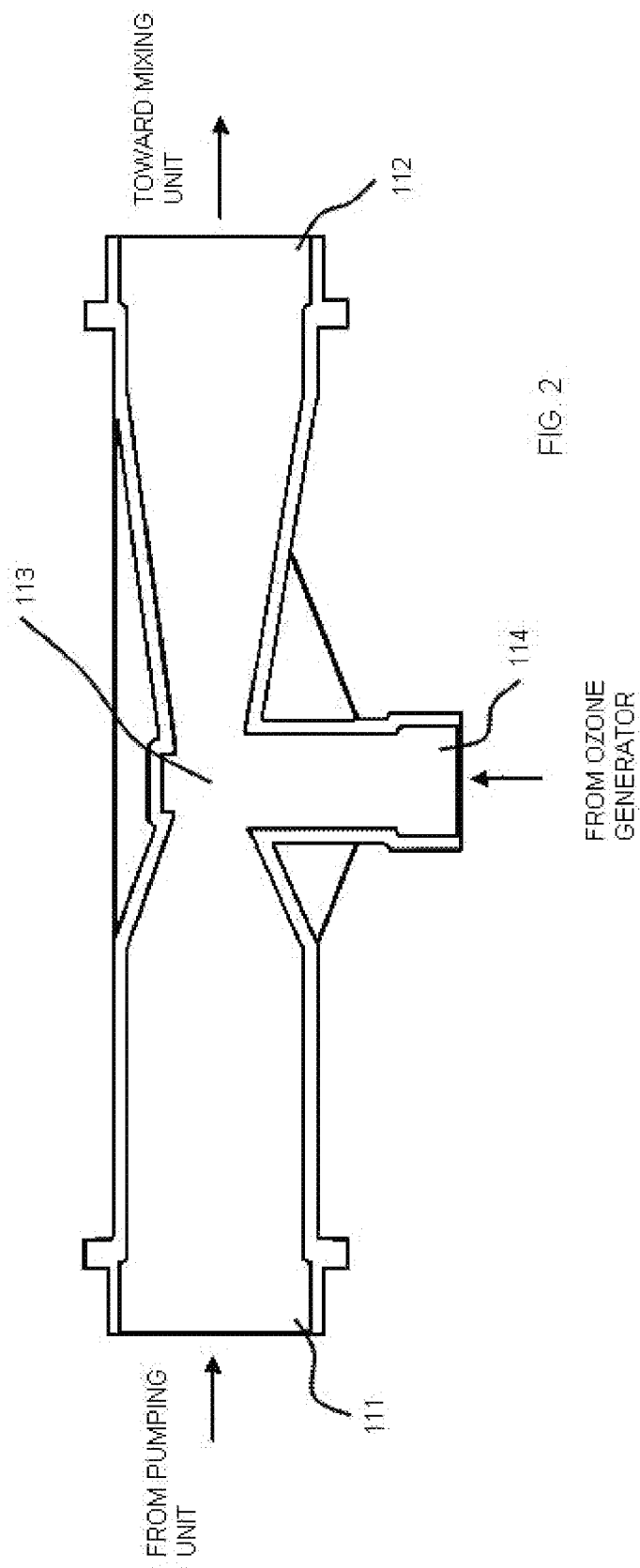
FIG. 2 is a side cross-sectional view of an exemplary gas-injecting unit embodied as a venturi.

The first pipe 101 leads to an ozone injecting unit 110 such as, but not limited to, a first venturi, where ozone gas is injected into the raw water. Referring to FIG. 2, an exemplary venturi is shown in more details. The venturi 110 is typically of tubular shape and comprises a water inlet 111, a water outlet 112, a constricted or throat portion 113 therebetween, and an ozone injecting inlet 114. As the skilled addressee would understand, as the raw water flows through the venturi 110 and through the constricted portion 113, ozone gas is drawn from the ozone injecting inlet 114 and injected into the raw water. Understandably, the "gas" effectively injected into the raw water is more or less a mixture of ozone (e.g. ~10-12%), oxygen (e.g. ~83-86%) and nitrogen (e.g. ~4-5%).

Referring back to FIG. 1, the ozone injecting inlet 114 of the ozone injecting unit 110 is fluidly connected to an ozone generating module 400. Ozone generating modules 400 are generally known in the art (e.g. U.S. Pat. No. 6,180,014) and will not be described any further. Different ozone generating modules 400 can be used for the purpose of the present invention. The present invention is not limited to any particular ozone generating modules 400.

The second pipe 103 leads to a retentate water injecting unit 120 such as, but not limited to, a second venturi similar in configuration to the first venturi shown in FIG. 2. For the sake of completeness, in the present embodiment, the second venturi 120 also comprises a water inlet 121, a water outlet 122, a constricted or throat portion 123, and a retentate water injecting inlet 124. The retentate water injecting unit 120 injects a portion of the retentate water coming from the membrane filtration module 300 into the raw water. The membrane filtration module 300 will be described further below.

The two flows of raw water exiting the ozone injecting unit 110 and the retentate water injecting unit 120 are then recombined via pipes 105 and 107 respectively and then directed to a mixing unit 130, such as a static mixer, wherein the raw water containing ozone and the raw water containing retentate water are thoroughly mixed.

Figure 3A:
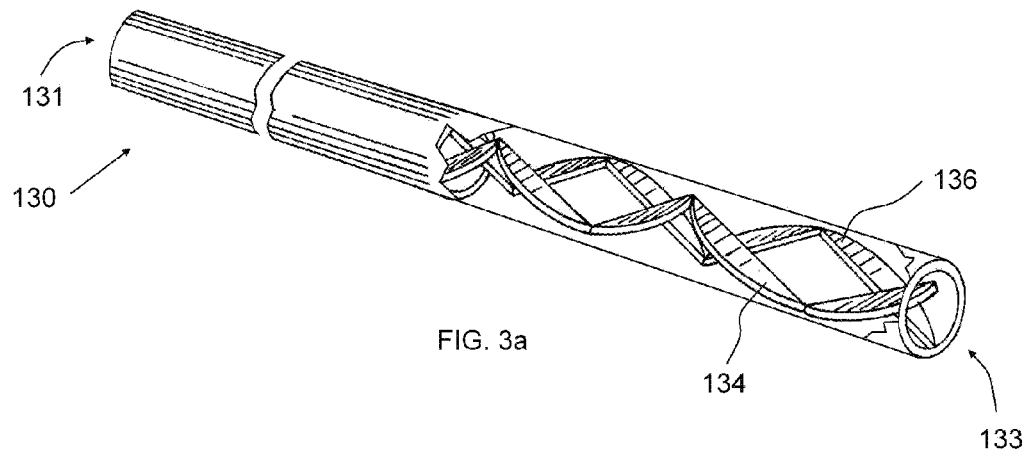
FIGS. 3a and 3b are respectively fragmentary perspective and cross-sectional views of an exemplary mixing unit embodied as a static mixer.
Figure 3B:
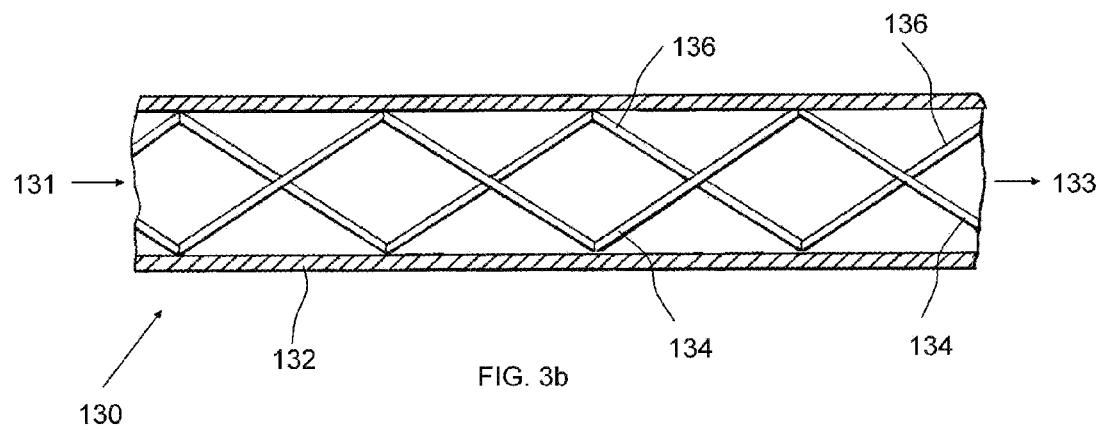

Referring to FIGS. 3a and 3b, an exemplary static mixer 130 is shown. The static mixer 130 typically comprises a tube or pipe 132 having an inlet 131 and an outlet 133 and having mounted therein two rows of axially-staggered angled plates 134 and 136. The two rows of plates 134 and 136 create a more or less tortuous path for the raw water containing ozone and the raw water containing retentate water. As the skilled addressee would understand, this tortuous path induces a swirling motion of the two water mixtures, thereby mixing them thoroughly. Understandably, other types of mixers could be used; the present invention is not so limited.

Returning to FIG. 1, the water exiting the mixing unit 130 is thus essentially a mixture of raw water, retentate water, and dissolved and non-dissolved gases, mainly ozone, oxygen and nitrogen.

At the exit of the mixing unit 130, the water flows into a pressurized contacting unit 140, such as a contacting chamber or reactor. According to the present embodiment, the pressure inside the contacting unit 140 varies between 20 and 120 psig. Preferably, the contacting unit 140 is configured to provide an optimal mass transfer between the ozone and the water and an optimal contacting time between the dissolved ozone and the pollutant present in the water. Preferably, at the exit of the contacting unit 140, the colours and odours of the water are reduced, the pathogens are mostly neutralized and/or inactivated and the organic (e.g. oils and greases) and inorganic (e.g. metals) particles and pollutants are mostly oxidised.

The skilled addressee will understand that the contacting unit 140 can be provided in different shapes and/or configurations. Nevertheless, in order to reduce the footprint of the apparatus 10, a preferred configuration for the contacting unit 140 would be one or more coiled pipes as schematically shown in FIG. 1. Understandably, the length and diameter of the pipe(s) could vary depending on the intended volume of water to be treated. Still, other configurations of contacting units are possible; the present invention is not so limited.

Preferably, but not necessarily, an ozone sensing unit 150, such as a conventional ozone sensor, is disposed downstream of the contacting unit 140 in order to measure the level of dissolved ozone still remaining in the water. The level of dissolved ozone remaining in the water after an ozone treatment is generally used by governmental regulatory bodies to determine if the ozone treated water is compliant with their water regulations. Preferably, but not exclusively, the level of dissolved ozone downstream of the contacting chamber 140 should be between 0.3 and 1 mg/L.

In the present embodiment, the ozone sensing unit 150 is only used to measure and determine the level of dissolved ozone remaining in the water. However, in an alternate embodiment, the ozone sensing unit 150 could be in electronic communication with the ozone generating module 400, directly or via a central control system (not shown), in order to feed the ozone measurements back to the ozone generating module 400 whereby the ozone generating module 400 could adjust (e.g. increase or reduce) its generation of ozone accordingly.

In order to maintain the pressure in the contacting unit 140, a pressure regulating unit 160 such as, but not limited to, a pressure sustaining valve, is disposed downstream thereof. It is to be understood that the pressure in the contacting unit 140 affects the amount of gases needed to saturate the water with dissolved gases. If the pressure in the contacting unit 140 varies, then the amount of gases needed to saturate the water with dissolved gases will also vary, which could be difficult to control. Hence, the pressure regulating unit 160 maintains the pressure in the contacting unit 140 at a relatively constant predetermined value such that the amount of gases needed to saturate the water with dissolved gases is known and more easily controlled.

Referring to FIGS. 4a and 4b, an exemplary pressure sustaining valve 160, in open and closed positions, is shown. The exemplary pressure sustaining valve 160 shown in FIGS. 4a and 4b is a hydraulically-operated and diaphragm-actuated valve which is known in the art. Hence, as the skilled addressee would understand, the valve 160 is a pilot-controlled valve comprising an adjustable, 2-way, pressure-sustaining pilot 161. The pilot 161 comprises a needle valve 162 which continuously allows flow from the main valve inlet 163 into the upper control-chamber 164. Using a pressure sensing element 166 (e.g. an adjustable spring), the pilot 161 senses the upstream pressure, i.e. the pressure in the contacting unit 140. Understandably, the pressure sensing element 166 should be set to a predetermined pressure. When the upstream pressure in the contacting unit 140 tend to fall below the predetermined pressure set in the pilot 161, the pilot 161 throttles, enabling pressure to accumulate in the upper control-chamber 164, causing the main valve 167 to throttle, sustaining the upstream pressure in the contacting unit 140 at the predetermined pressure set in the pilot 161. However, should the upstream pressure in the contacting unit 140 fall below the predetermined pressure, then the pilot 161 closes, causing the main valve 167 to close drip-tight (see FIG. 4b). Finally, should the upstream pressure in the contacting unit 140 tend to rise above the predetermined pressure set in the pilot 161, then the pilot 161 releases the accumulated pressure causing the main valve 167 to modulate open. The needle valve 162 controls the closing speed.

The water exiting the pressure regulating unit 160 through the outlet 165 effectively exits the ozone treatment module 100 and enters the gas-liquid separation module 200.

Figure 5:
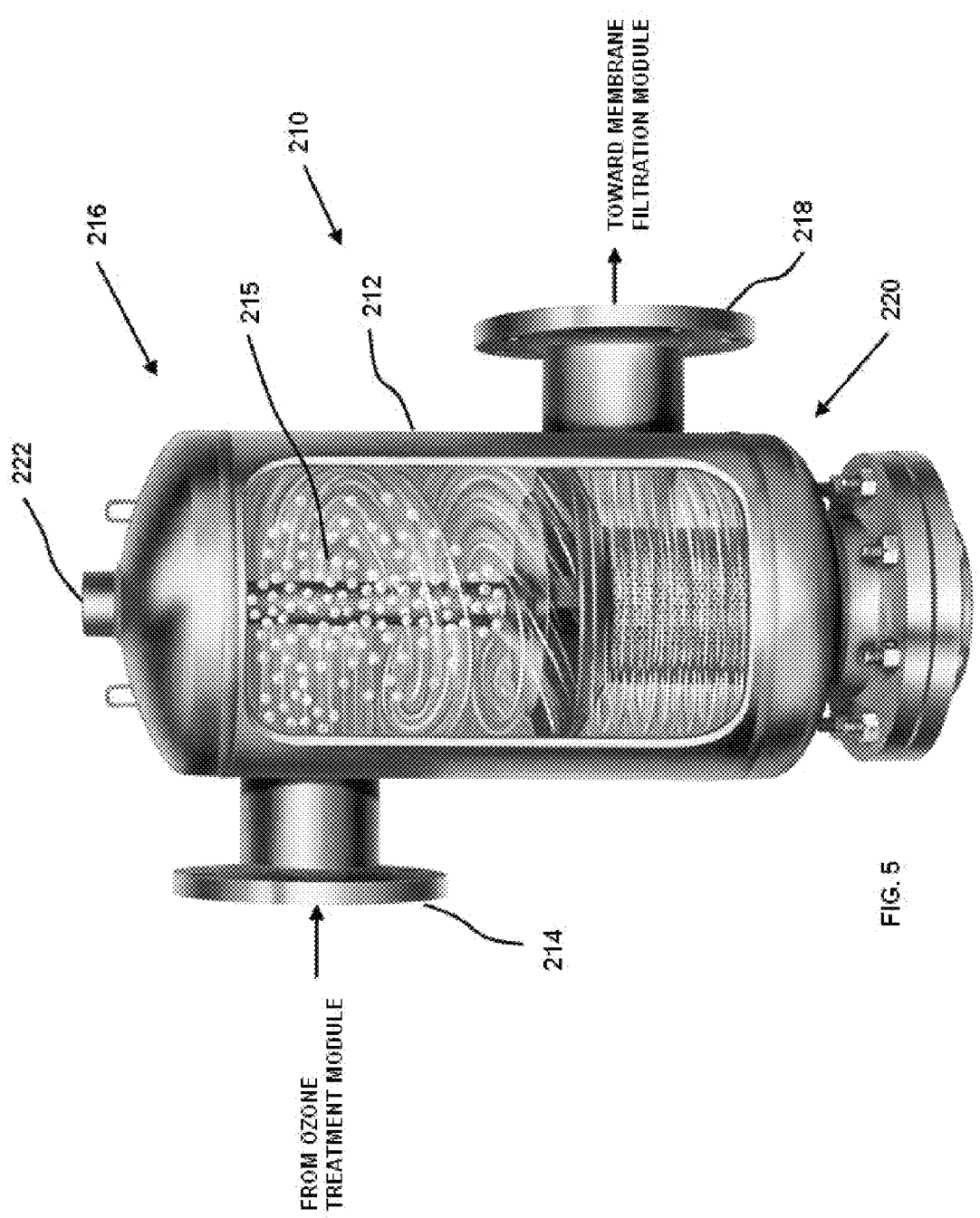
FIG. 5 is a fragmentary side view of an exemplary gas-liquid separation unit embodied as a centrifugal gas-liquid separator.

The gas-liquid separation module 200 mainly comprises a gas-liquid separation unit 210 and a gas treatment unit 230. In the present embodiment, the gas-liquid separation unit 210 is embodied as a centrifugal gas-liquid separator. Referring to FIG. 5, the gas-liquid separator 210 comprises a vertical cylindrical column 212 having a tangential water inlet 214 located in the upper portion 216 of the column 212 and a water outlet 218 located in the lower portion 220 of the column 212. The column 212 also comprises a gas outlet 222 located at the top thereof where the separated gases are vented.

The water exiting the ozone treatment module 100 is mainly composed of ozone-treated water and dissolved and non-dissolved gases, mainly ozone, oxygen and nitrogen. As the skilled addressee would understand, as the water exiting the ozone treatment module 100 enters the column 212 tangentially through the tangential inlet 214, the entering water generates a rotating movement of the mass of water contained in the column 212 (see FIG. 5); this rotating movement, or vortex, generating centrifugal forces. As the non-dissolved gases (e.g. bubbles) are less dense than the water, the non-dissolved gases move toward the upper center of the rotating mass of water, thereby forming a gaseous cone 215 in the upper central region of the rotating water. The non-dissolved gases located in the gaseous cone 215 are then free to exit the column 212 through the gas outlet 222. At the bottom of the column 212, the water, now free of non-dissolved gases, exits the column 212 through the outlet 218.

Hence, as the water circulates through the gas-liquid separation unit 210, essentially all the non-dissolved gases (e.g. oxygen, nitrogen and ozone) are removed. Additionally, should the water still contain non-dissolved volatile compounds, these compounds could also be removed from the water.

Since some of the non-dissolved gases removed by the gas-liquid separation unit 210 could be corrosive and/or toxic, the removed gases are preferably sent to a gas treatment unit 230 for further treatment (e.g. neutralisation or destruction).

At the exit of the gas-liquid separation module 200, the ozone-treated water is now substantially free of non-dissolved gases (e.g. bubbles) and is substantially saturated with dissolved gases (e.g. oxygen, nitrogen and ozone). This ozone-treated and gas-saturated water is then sent to the last module of the apparatus 10, namely the membrane filtration module 300, where it will undergo a membrane filtration treatment.

It is to be understood that it is important that the water exiting the gas-liquid separation unit 210 be substantially free of non-dissolved gases and saturated with dissolved gases since the saturation in dissolved gases and the lack of non-dissolved are important, if not critical, to the formation of white water, i.e. microbubbles, during the following filtration stage.

Referring back to FIG. 1, the membrane filtration module 300 generally comprises a membrane filtration unit 310 presently embodied as one or more hollow fiber membrane filters (only one is shown for clarity). Should more than one membrane filter 310 be used in the present apparatus 10, they would generally be disposed in parallel whereby each membrane filter 310 would filter a portion of the gas-saturated water. Membrane filters 310 are generally known in the art and shall not be described any further. Still, positive pressure membrane filters 310 having openings corresponding with micro-filtration and/or ultra-filtration are preferred for the proper functioning of the present embodiment.

As the gas-saturated water enters the membrane filter 310 via the filter inlet 311, it is separated into a first portion (e.g. ~90%) which will undergo membrane filtration and a second portion (e.g. ~10%) which will not undergo membrane filtration. This second portion of the water is instead directly sent to the retentate water outlet 312 of the filter 310.

According to an important aspect of the present invention, as the first portion of the water, which is saturated with dissolved gases, passes through the openings of the membranes, it undergoes a depressurisation or pressure drop. In the present embodiment, the pressure drop varies between 10 and 80 psig. This pressure drop is important. As the gas-saturated water passes through the openings of the membranes and is depressurized, the water, which was saturated with dissolved gases, can no longer hold or support all the dissolved gases at the new reduced pressure. Consequently, an important quantity of microbubbles, composed mainly of oxygen, ozone and nitrogen, is formed substantially simultaneously. The almost instantaneous formation of these microbubbles generally gives a milky white colour or appearance the water, hence the term "white water".

It is important to note that if the gas-saturated water still contains bubbles of non-dissolved gases prior to its passage through membrane filter(s), there will be limited formation of white water in the case where there is only a small amount of bubbles or even no formation at all if a significant amount of bubbles is present.

The formation of these microbubbles is an important aspect of the present invention. Indeed, since the depressurisation of the water occurs during the passage of the gas-saturated water through the membranes, a large portion of the microbubbles are formed either near the surface of the membranes or inside the openings thereof. The microbubbles formed near the surface of the membranes generally act as a shield preventing particles remaining in the water from sticking to the membranes. Additionally, some of these microbubbles effectively dislodge at least a portion of the particles which may have already accumulated on the surface of the membranes. Furthermore, the microbubbles formed inside the openings generally prevent the clogging thereof and/or can dislodge particles which may be stuck therein. Finally, the remaining microbubbles tend to coagulate particles still present in the water and to bring these coagulated particles to the top of the filter 310, near the retentate outlet 312 from which they are sent back to the ozone treatment module 100 for further treatment.

The formation of microbubbles thus serves as a self-cleaning mechanism for the membrane or membranes of the membrane filter 310. Furthermore, since the passage of gas-saturated water through the openings of the membranes is essentially continuous, the membranes are subjected to an essentially continuous cleaning, thereby substantially reducing the need to mechanically and/or chemically clean the membranes of the filter 310, which is a clear improvement over the prior art.

Understandably, once on the other side of the membranes, the first portion of the water, now essentially clean, exits the filter 310 through the filtrate water outlet 313 and then exits the apparatus 10.

As mentioned above, a second portion of the gas-saturated water is directly sent toward the retentate outlet 312 of the membrane filter 310. As this second portion of the gas-saturated water flows toward the retentate outlet 312, it captures and carries along non-dissolved gases, i.e. coalesced microbubbles, and a portion of the particles which have accumulated in the filter 310 (e.g. coagulated particles). The retentate outlet 312 being fluidly connected to the retentate water injecting inlet 124 of the retentate water injecting unit 120 via a return pipe 15, this second portion of the gas-saturated water, now containing non-dissolved gases and particles, is effectively returned to the ozone treatment module 100 of the apparatus 10 where it will be treated along with the raw water as explained hereinabove. As this retentate water is recycled through the apparatus 10, the non-dissolved gases and the particles contained therein will be further treated and/or removed from the water.

Hence, as the skilled addressee would understand, the apparatus 10 of the present invention not only continuously treats and filters raw water, it also further continuously treats and filters pollutants and particles which have been removed from the membrane filter 310 and which are recycled through the apparatus 10.

Additionally, even though the present apparatus 10 has been described as a stand-alone apparatus, the skilled addressee would understand that the present apparatus 10 could form part of a larger filtration system. The present invention is not so limited.

Finally, even though only one of certain components such as the static mixer 130, the contacting chamber 140, the pressure regulating unit 160, the gas-liquid separation unit 210, and the membrane filter 310 have been shown, it is to be understood that more than one of these components could be mounted in parallel depending of the volume of water to be treated. In addition, the exact size and configuration of each component could vary to take into account the volume of water to be treated.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for treating water, the method comprising:
   a) injecting gases into the water, the gases comprising ozone gas;
   b) contacting the gases with the water to cause a dissolution of at least a portion of the gases into the water;
   c) removing substantially all undissolved gases from the water such that the water becomes substantially saturated with dissolved gases and substantially free of undissolved gases;
   d) passing the gas-saturated water through at least one filter, the passage of the gas-saturated water through the at least one filter causing a pressure-drop, the pressure-drop causing the formation of micro-bubbles.

2. A method as claimed in claim 1, wherein the injecting of the gases is performed with at least one venturi.

3. A method as claimed in claim 1, wherein the contacting of the gases with the water is performed in at least one contacting chamber.

4. A method as claimed in claim 1, wherein the contacting of the gases with the water is performed under a predetermined pressure.

5. A method as claimed in claim 4, wherein the predetermined pressure is maintained with a pressure-sustaining valve.

6. A method as claimed in claim 1, further comprising mixing the gases and the water after the injection of the gases.

7. A method as claimed in claim 6, wherein the mixing occurs prior to the contacting of the gases with the water.

8. A method as claimed in claim 6, wherein the mixing of the gases and the water is performed with at least one mixer.

9. A method as claimed in claim 6, wherein the mixing of the gases and the water is performed with at least one static mixer.

10. A method as claimed in claim 1, wherein the removing of substantially all undissolved gases is performed with a gas-liquid separator.

11. A method as claimed in claim 1, wherein the removing of substantially all undissolved gases is performed with a centrifugal gas-liquid separator.

12. A method as claimed in claim 1, wherein the at least one filter is at least one membrane filter.

13. A method as claimed in claim 1, further comprising injecting a portion of the water from the filter into the water to be treated.

14. A method for treating water with ozone, the method comprising:
   a) injecting ozone into the water;
   b) mixing the ozone and the water;
   c) contacting the ozone and the water under pressure such as to obtain a mixture of water, dissolved gases and undissolved gases;
   d) removing substantially all undissolved gases from the water mixture such that the water mixture becomes substantially saturated with dissolved gases and substantially free of undissolved gases;
   e) passing the water mixture through at least one filter, the passage causing a pressure drop which forces at least a portion of the dissolved gases out of the water mixture, thereby causing the formation of micro-bubbles.

15. A method as claimed in claim 14, wherein the injecting of the ozone is performed with at least one venturi.

16. A method as claimed in claim 14, wherein the contacting of the ozone with the water is performed in at least one contacting chamber.

17. A method as claimed in claim 14, wherein the pressure is maintained with a pressure-sustaining valve.

18. A method as claimed in claim 14, wherein the mixing of the ozone and the water is performed with at least one mixer.

19. A method as claimed in claim 14, wherein the mixing of the ozone and the water is performed with at least one static mixer.

20. A method as claimed in claim 14, wherein the removing of substantially all undissolved gases is performed with a gas-liquid separator.

21. A method as claimed in claim 14, wherein the removing of substantially all undissolved gases is performed with a centrifugal gas-liquid separator.

22. A method as claimed in claim 14, wherein the at least one filter is at least one membrane filter.

23. A method as claimed in claim 14, further comprising recirculating a portion of the water from the filter into the water to be treated.

* * * * *